United States Patent
Robert et al.

(10) Patent No.: US 7,673,121 B2
(45) Date of Patent: Mar. 2, 2010

(54) CIRCUIT FOR MONITORING A MICROPROCESSOR AND ANALYSIS TOOL AND INPUTS/OUTPUTS THEREOF

(75) Inventors: Catherine Robert, Quaix en Chartreuse (FR); Xavier Robert, Saint Georges de Commiers (FR); Jehan-Philippe Barbiero, Vizille (FR)

(73) Assignee: STMicroelectronics S.A., Montrouge (FR)

( * ) Notice: Subject to any disclaimer, the term of this patent is extended or adjusted under 35 U.S.C. 154(b) by 0 days.

(21) Appl. No.: 10/535,063

(22) PCT Filed: Nov. 14, 2002

(86) PCT No.: PCT/FR02/03909

§ 371 (c)(1),
(2), (4) Date: May 9, 2006

(87) PCT Pub. No.: WO2004/046928

PCT Pub. Date: Jun. 3, 2004

(65) Prior Publication Data

US 2006/0212684 A1      Sep. 21, 2006

(51) Int. Cl.
    G06F 7/38    (2006.01)
    G06F 9/00    (2006.01)
    G06F 9/44    (2006.01)
(52) U.S. Cl. .................. 712/225; 712/231; 710/23; 710/36
(58) Field of Classification Search .............. 712/225, 712/231; 711/23, 36
See application file for complete search history.

(56) References Cited

U.S. PATENT DOCUMENTS 4,783,739 A * 11/1988 Calder ........................ 710/4

(Continued)

FOREIGN PATENT DOCUMENTS

EP        1184790 A       3/2002

OTHER PUBLICATIONS

International Search report from corresponding International Application No. PCT/FR2002/003909, filed Nov. 14, 2002.

(Continued)

*Primary Examiner*—Alford W Kindred
*Assistant Examiner*—Jesse R Moll
(74) *Attorney, Agent, or Firm*—Lisa K. Jorgenson; James H. Morris; Wolf, Greenfield & Sacks, P.C.

(57) ABSTRACT

A method for the transmission of digital messages by the output terminals of a monitoring circuit which is integrated into a microprocessor, the digital messages being representative of first specific events which are dependent on the execution of a series of instructions by the microprocessor. The method includes transmitting the following signals to the monitoring circuit by dedicated access points, namely (i) a request signal for the sending of a message that is associated with a specific event from second specific events which are independent of the execution of the series of instructions by the microprocessor and (ii) a signal comprising characteristic data which are associated with the aforementioned specific event; forcing the monitoring circuit to read the request message and, if the resource management conditions are fulfilled, sending an acknowledgement message and storing said characteristic data signal and transmitting a digital message which is representative of the stored characteristic data signal.

7 Claims, 1 Drawing Sheet

U.S. PATENT DOCUMENTS

| | | | |
|---|---|---|---|
| 5,724,505 | A | 3/1998 | Argade et al. |
| 5,732,279 | A * | 3/1998 | Wood et al. ..................... 710/1 |
| 5,848,264 | A | 12/1998 | Baird et al. |
| 5,974,573 | A | 10/1999 | Martin |
| 6,052,774 | A | 4/2000 | Segars et al. |
| 6,070,210 | A * | 5/2000 | Cheon ........................ 710/105 |
| 6,961,875 | B2 * | 11/2005 | Floyd et al. ................... 714/39 |
| 2002/0013893 | A1 | 1/2002 | Roy et al. |

OTHER PUBLICATIONS

International Search report from related International Application No. PCT/FR2002/003908, filed Nov. 14, 2002.

International Search Report from related International Application No. PCT/FR2002/003996, filed Nov. 21, 2002.

Nexis 5001 Forum: *Standard for a Global Embedded Processor Debug Interface*, Dec. 15, 1999, IEEE-ISTO XP002247195.

* cited by examiner

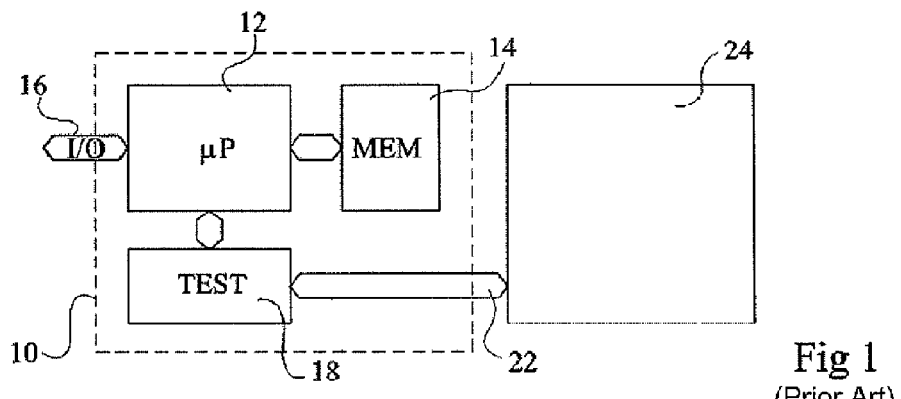
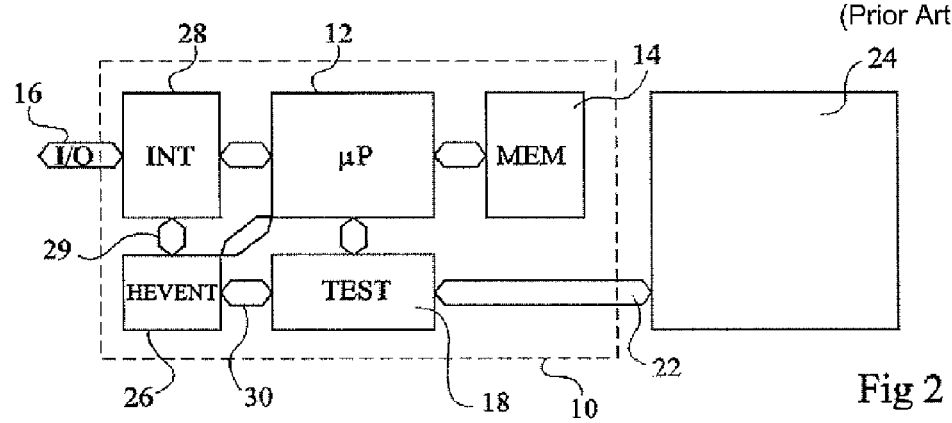
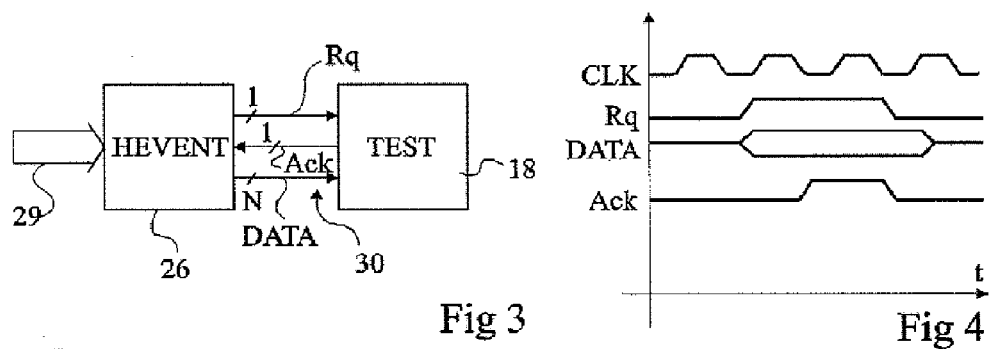
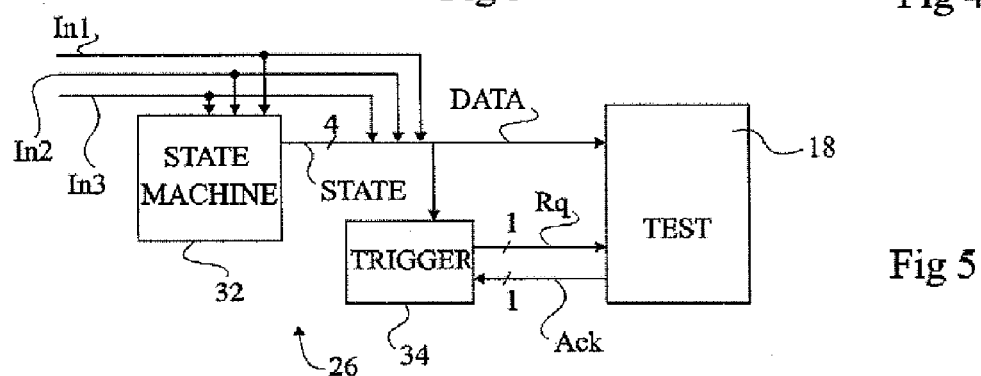

CIRCUIT FOR MONITORING A MICROPROCESSOR AND ANALYSIS TOOL AND INPUTS/OUTPUTS THEREOF

BACKGROUND OF THE INVENTION

1. Field of the Invention

The present invention relates to the testing of microprocessors. It more specifically relates to a method and device for digital data transmission between a monitoring circuit integrated in a microprocessor chip and an analysis tool.

2. Discussion of the Related Art

FIG. 1 schematically shows an integrated circuit 10 comprising a microprocessor (µP) 12, an internal memory (MEM) 14, and input/output terminals (I/O) 16. Microprocessor 12 is intended to execute a program or software stored in memory 14. Under control of the program, microprocessor 12 may process data provided by input/output terminals 16 or stored in memory 14 and read or write data through input/output terminals 16.

To check the proper operation of the microprocessor, a monitoring circuit 18 (TEST) is generally integrated on integrated circuit 10. Monitoring circuit 18 is capable of reading specific data provided by microprocessor 12 on execution of a program, and of possibly processing the read data. Test terminals 22 connect monitoring circuit 18 to an analysis tool 24. Analysis tool 24 may perform a processing of the received signals, for example, according to commands provided by a user, and ensure a detailed analysis of the operation of microprocessor 12. In particular, analysis tool 24 may determine the program instruction sequence really executed by microprocessor 12.

The number of test terminals 22 may be on the same order of magnitude as the number of input/output terminals 16, for example, from 200 to 400 terminals. Test terminals 22 as well as the connections of monitoring circuit 18 take up a significant silicon surface area, which causes an unwanted increase in the circuit cost. For this purpose, a first version of integrated circuit 10 comprising monitoring circuit 18 and test terminals 22 is produced in small quantities to adjust debug the program of microprocessor 12 or "user program". After this debugging, a version of integrated circuit 10 without monitoring circuit 18 and without test terminals 22 is sold. This requires forming of two versions of the integrated circuit, which requires a significant amount of work and is relatively expensive. Further, the final chip is not necessarily identical to the tested chip.

To overcome the above-mentioned disadvantages, it is desired to form a monitoring circuit 18 which takes up a reduced surface area and only requires a reduced number of test terminals 22, which decreases the selfcost of the monitoring circuit. Monitoring circuit 18 can then be left on the finally sold integrated circuit 10.

It is thus desired to decrease the number of signals provided by monitoring circuit 18. For this purpose, certain logic operations are directly performed at the level of monitoring circuit 18 on the data measured at the level of microprocessor 12 to only transmit messages having an important information content.

Thus, standard IEEE-ISTO-5001 in preparation provides in its 1999 version, accessible, for example, on website www.ieee-isto.org/Nexus5001, a specific message exchange protocol between a monitoring circuit and an analysis tool for a monitoring circuit 18 requiring but a reduced number of test terminals 22.

Among the messages provided by monitoring circuit 18 according to standard IEEE-ISTO-5001, a message for example indicates that a jump has occurred in the program executed by microprocessor 12. Another message may indicate the fact that microprocessor 12 executes a read or write operation, for example, an operation of reading or writing of data from or into an area of memory 14. Based on the messages transmitted by monitoring circuit 18, analysis tool 24 reconstitutes the instruction sequence executed by microprocessor 12. The reconstituted instruction sequence can then be compared with an instruction sequence theoretically executed by microprocessor 12 to determine malfunctions of microprocessor 12.

Certain events, however, do not correspond to specific instructions of the program executed by microprocessor 12 or do not cause modifications in the execution of the program by microprocessor 12. Thus applies, for example, in the case of a mobile telephony application, to the automatic blanking of the screen of a portable phone controlled by a specific control signal which is not provided by microprocessor 12 of the portable phone. Such events are generally not detected by monitoring circuit 18 and thus do not cause the transmission of messages by monitoring circuit 18 to analysis tool 24. It may also be, for example, specific signals generated by the internal circuits of microprocessor 12.

It would be desirable for analysis tool 24 to be able to indicate to the user that such events have occurred. Indeed, such events may be helpful in the diagnosis of malfunctions of microprocessor 12.

SUMMARY OF THE INVENTION

The present invention aims at obtaining a device and a method for transmitting messages between a test circuit and an analysis tool enabling transmission of messages representative of events which are not linked to the execution of the program by the microprocessor.

The present invention further aims at obtaining a message transmission device and method which cause as little modifications as possible of the monitoring circuit provided by standard IEEE-ISTO-5001.

The present invention provides a method for transmitting digital messages through output terminals of a monitoring circuit integrated with a microprocessor, the digital messages being representative of first specific events depending on the execution of an instruction sequence by the microprocessor, comprising the steps of transmitting, to the monitoring circuit through dedicated accesses, a request signal for the sending of a message associated with a specific event from among second specific events independent from the execution of the instruction sequence by the microprocessor and a signal of characteristic data associated with said specific event; having the monitoring circuit read said request message and, if resource management conditions are fulfilled, transmitting, through a dedicated access, an acknowledgement message and storing said characteristic data signal; and transmitting a digital message representative of the stored characteristic data signal.

According to an embodiment of the present invention, the resource management conditions are fulfilled when the monitoring circuit is not transmitting messages representative of the first specific events.

According to an embodiment of the present invention, the digital message representative of the stored data signal comprises an identifier and the characteristic data signal.

According to an embodiment of the present invention, the characteristic data signal corresponds to the values on input terminals of the microprocessor.

The present invention also provides a device for transmitting digital messages between a monitoring circuit integrated with a microprocessor and an analysis tool, first digital messages being representative of first specific events depending on the execution of an instruction sequence by the microprocessor. The device comprises means for detecting a specific event from among second specific events independent from the execution of the instruction sequence by the microprocessor; means for transmitting a request for transmitting to the monitoring circuit, when a specific event is detected, a request signal and a characteristic data signal associated with said specific event. Further, the monitoring circuit comprises means for storing the characteristic data signal provided by the request transmission means, means for transmitting to the request transmission means, an acknowledgement signal when the characteristic data signal is stored, and means for transmitting a digital message from said stored characteristic data signal.

According to an embodiment of the present invention, the detection means, the request transmission means, the monitoring circuit, and the microprocessor are integrated on the same chip.

According to an embodiment of the present invention, the detection means is connected to input terminals of the microprocessor.

BRIEF DESCRIPTION OF THE DRAWINGS

The foregoing and other objects, features, and advantages of the present invention will be discussed in detail in the following non-limiting description of specific embodiments in connection with the accompanying drawings, among which:

FIG. 1, previously described, very schematically shows the architecture of a conventional chip integrating a microprocessor and a monitoring circuit;

FIG. 2, very schematically shows an example of the forming of the architecture of a chip according to the present invention;

FIG. 3 shows a detail of FIG. 2;

FIG. 4 shows a timing diagram of signals characteristic of the message transmission method according to the present invention; and FIG. 5 shows a specific embodiment of the system of FIG. 3.

DETAILED DESCRIPTION

FIG. 2 shows an example of the forming of a chip 10 according to the present invention integrating a request circuit 26 (HEVENT) and an interface circuit 28 (INT). Interface circuit 28 is connected to input/output terminals 16 and to microprocessor 12. Interface circuit 28 is capable of setting up the signals received from input/output terminals 16 so that they are exploitable by microprocessor 12 and of setting up the signals provided by microprocessor 12 before transmission thereof to the outside of chip 10.

Interface circuit 28 provides over a connection 29 to request circuit 26 signals that may correspond to a specific selection of some of the signals of input/output terminals 16. Request circuit 26 also receives signals directly from microprocessor 12. Such signals may for example indicate the execution of a specific instruction by microprocessor 12. Finally, request circuit 26 exchanges signals with monitoring circuit 18 over a connection 30.

According to a variation of the present invention, interface circuit 28 is not integrated on chip 10. Request circuit 26 is then directly connected to some of input/output terminals 16.

FIG. 3 shows a more detailed example of the signals exchanged over connection 30 between request circuit 26 and monitoring circuit 18. According to the present example of embodiment, request circuit 26 is capable of transmitting to monitoring circuit 18 a request signal Rq over a first one-bit line and a binary data signal DATA over N 1-bit lines forming a data bus. As an example, request circuit 26 may transmit, on each of the lines forming the data bus, a signal present on one of input/output terminals 16. Data signal DATA may also result from a previous processing of signals present on input/output terminals 16 performed by interface circuit 28. As an example, certain bits of signal DATA may correspond to a specific identifier, while the other bits of message DATA may correspond to some of the signals received by input/output terminals 16. Generally, the most significant bits of signal DATA are not transmitted when they are at zero, to reduce the amount of exchanged data.

Monitoring circuit 18 is capable of transmitting to analysis tool 24 a message based on data signal DATA. The message may comprise an identifier, indicating that the message is relative to the occurrence of an event which is not linked to the execution of the program by microprocessor 12, and data signal DATA. Monitoring circuit 18 is capable of transmitting to request circuit 26 an acknowledgement signal Ack over a second bit line.

FIG. 4 shows a timing diagram of the signals exchanged between request circuit 26 and monitoring circuit 18 according to the example of embodiment of FIG. 3. Request circuit 26 receives a clock signal CLK which is also provided to microprocessor 12 and to monitoring circuit 18. When request circuit 26 receives signals from interface circuit 28 indicating that an event has occurred for which monitoring circuit 18 must transmit a message to analysis tool 24, request circuit 26 sets request signal Rq to the high state and maintains stable on the data bus a specific value of data signal DATA associated with the event. Monitoring circuit 18 samples at clock frequency CLK request signal Rq and data signal DATA over the data bus. When a high state of request signal Rq is detected, monitoring circuit 18 is warned that it must transmit a message in relation with the value of data signal DATA present on the data bus. The storage of data signal DATA by monitoring circuit 18 is performed at the same clock cycle as the detection of the high state of request signal Rq or at a subsequent clock cycle according to the workload of monitoring circuit 18. When the storage is performed, monitoring circuit 18 sets acknowledgement signal Ack to the high state. When, at the next clock cycle, request circuit 26 samples acknowledgement circuit Ack in the high state, request circuit 26 sets request signal Rq to the low state and stops the maintaining of the specific value of data signal DATA on the data bus. The request circuit can then, at a subsequent clock cycle, set request signal Rq back to the high state if an event corresponding to a message to be transmitted by monitoring circuit 18 occurs.

The use of request signals Rq and acknowledgement signals Ack enables avoiding that the additional messages, associated with events which are not linked to the execution of the program by microprocessor 12, to be transmitted by monitoring circuit 18, modify the normal operation of the monitoring circuit. Indeed, as long as monitoring circuit 18 is busy transmitting to analysis tool 24 determined messages based on data provided by microprocessor 12, especially according to standard IEEE-ISTO-5001, it transmits no acknowledgement signal Ack to request circuit 26 even if the request signal is high. Request circuit 26 then maintains the value of data signal DATA present on the data bus. Request circuit 26 may comprise a buffer memory area in which several data DATA to be transmitted to monitoring circuit 18 may be stored as long as monitoring circuit 18 is not available. Given that, generally, request signal 26 only transmits new values of data signal DATA to monitoring circuit 18 at a low frequency with respect to the frequency of message transmission by monitoring circuit 18, the size of such a buffer memory area may be relatively small.

FIG. 5 shows a more detailed example of embodiment of request circuit 26 of FIGS. 2 and 3.

Request circuit 26, according to this example of embodiment, comprises a state machine 32 (STATE MACHINE) receiving input data In1, In2, In3, provided for example by interface circuit 28. As an example, three inputs are shown. State machine 32 provides monitoring circuit 18 with a state signal STATE comprising for example four bits. To these four bits are added the value of the three inputs In1, In2, In3 to form state signal DATA transmitted to monitoring circuit 18. Data signal DATA is also provided to a logic circuit 34 (TRIGGER) which is capable of transmitting request signal Rq to monitoring circuit 18 and receive acknowledgement signal Ack from monitoring circuit 18.

Logic circuit 34 provides a request signal Rq only for specific state signals STATE among all the state signals that can be provided by state machine 32. The value of data signal DATA is thus read by monitoring circuit 18 only when state signal STATE is equal to one of the specific state signal values.

Logic circuit 34 can be programmable to modify the specific values of state signals STATE of state machine 32 for which a request signal Rq is transmitted to monitoring circuit 18. As an example, registers of configuration of logic circuit 34 may be programmed by analysis tool 24 via monitoring circuit 18.

The present invention has many advantages:

First, it enables taking into account by the monitoring circuit of data for the transmission to the analysis tool of messages characteristic of events which are not linked to the microprocessor operation.

Second, it enables modifying as little as possible the structure of the monitoring circuit provided by standard IEEE-ISTO-5001.

Third, the use of request and acknowledgement signals enables the test circuit to process the data provided by the request circuit only when it has transmitted all the messages defined based on data directly transmitted by the microprocessor.

Fourth, in the case where the monitoring circuit has too high an activity to transmit to the analysis tool messages based on the data signals provided by the request circuit, the request circuit may store the values of the data signals.

Of course, the present invention is likely to have various alterations and modifications which will occur to those skilled in the art. For example, it is possible for the request circuit not to be integrated to the chip comprising the microprocessor and the monitoring circuit. The monitoring circuit is then connected by terminals dedicated to the request circuit formed outside of the chip.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method comprising:

transmitting first digital messages to an analysis tool from a monitoring circuit integrated with a microprocessor, the first digital messages being representative of first specific events which depend on execution of an instruction sequence by the microprocessor;

detecting, with a request circuit, at least one second specific event independent from the execution of the instruction sequence by the microprocessor;

transmitting from the request circuit to the monitoring circuit through dedicated accesses, when the at least one second specific event is detected, a request signal indicating a request that a message associated with said at least one second specific event be transmitted to said analysis tool and a characteristic data signal associated with said at least one second specific event;

storing the characteristic data signal in the monitoring circuit, and, if resource management conditions are fulfilled, transmitting an acknowledgement signal from the monitoring circuit to the request circuit through a dedicated access, wherein the acknowledgment signal notifies the request circuit that the request has been granted;

transmitting at least one second digital message representative of the stored characteristic data signal from said monitoring circuit to the analysis tool; and processing the first digital messages and the at least one second digital message via the analysis tool to analyze operation of the microprocessor, including determining the instruction sequence executed by the microprocessor, and the at least one second specific event to determine at least one relationship between the instruction sequence and the at least one second specific event.

2. The method of claim 1, in which the resource management conditions are fulfilled when the monitoring circuit is not transmitting the first digital messages representative of the first specific events.

3. The method of claim 1, in which the at least one second digital message representative of the stored characteristic data signal comprises an identifier indicating that the at least one second digital message is relative to the at least one second specific event independent from the execution of the instruction sequence by the microprocessor, and the characteristic data signal.

4. The method of claim 1, in which the characteristic data signal corresponds to the values on input terminals of the microprocessor.

5. An apparatus, comprising:

a microprocessor;

a memory integrated with the microprocessor;

an analysis tool;

a monitoring circuit for transmitting first digital messages to the analysis tool, the first digital messages being representative of first specific events which depend on execution of an instruction sequence by the microprocessor; and a request circuit for detecting at least one second specific event independent from the execution of the instruction sequence by the microprocessor, the request circuit transmitting to the monitoring circuit through dedicated accesses, when the at least one second specific event is detected, a request signal indicating a request that a message associated with said at least one second specific event be transmitted to said analysis tool and a characteristic data signal associated with said at least one second specific event, wherein the monitoring circuit stores the characteristic data signal, if resource management conditions are fulfilled, transmits to the request circuit an acknowledgement signal when the characteristic data signal is stored, wherein the acknowledgement signal notifies the request circuit that the request has been granted, and transmits to the analysis tool at least one second digital message representative of said stored characteristic data signal, wherein the at least one second digital message comprises an identifier indicating that the at least one second digital message is relative to the at least one second specific event independent from the execution of the instruction sequence by the microprocessor, and the characteristic data signal, and wherein the analysis tool processes the first digital messages and the at least one second digital message to analyze operation of the microprocessor, including determining the instruction sequence executed by the microprocessor, and the at least one second specific event to determine at least one relationship between the instruction sequence and the at least one second specific event.

6. The apparatus of claim 5, in which the request circuit, the monitoring circuit, and the microprocessor are integrated in a same chip.

7. The apparatus of claim 5, in which the request circuit is connected to input terminals of the microprocessor.

* * * * *